Dec. 16, 1952 A. V. JIROUCH 2,621,706
FILM SPLICING APPARATUS
Filed Aug. 24, 1949 2 SHEETS—SHEET 1
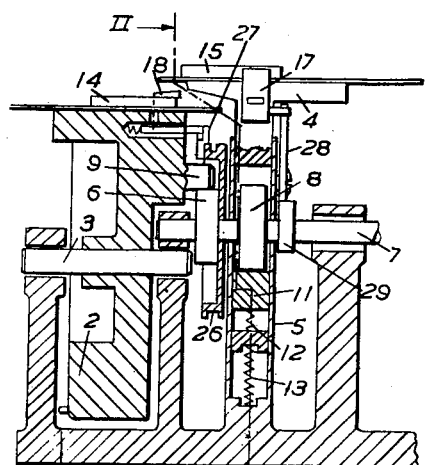
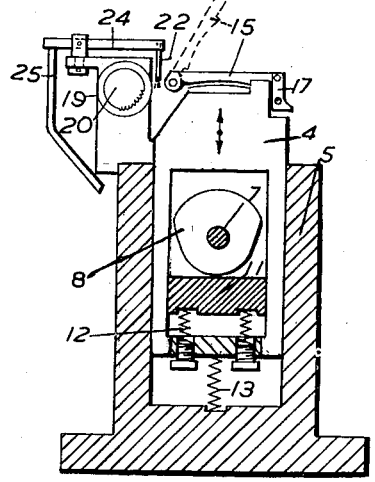
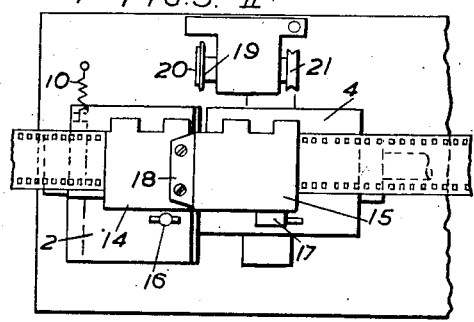
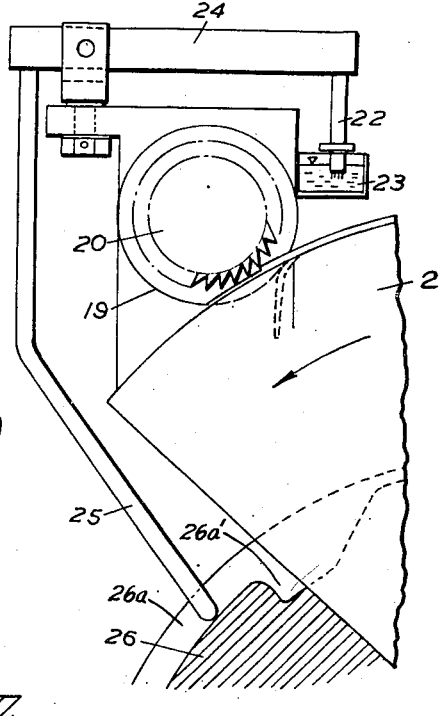
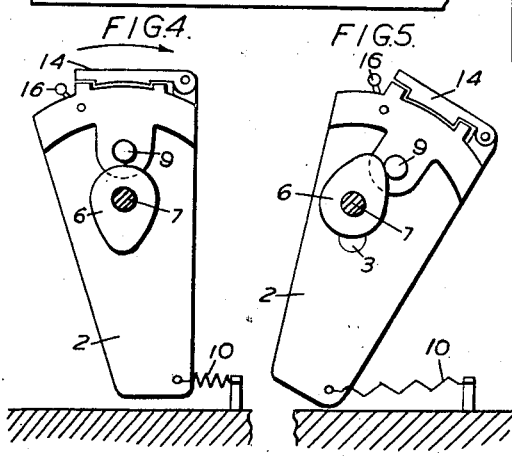
Inventor
Augustine Vojteo Jirouch
By Dec. 16, 1952   A. V. JIROUCH   2,621,706
FILM SPLICING APPARATUS
Filed Aug. 24, 1949   2 SHEETS—SHEET 2
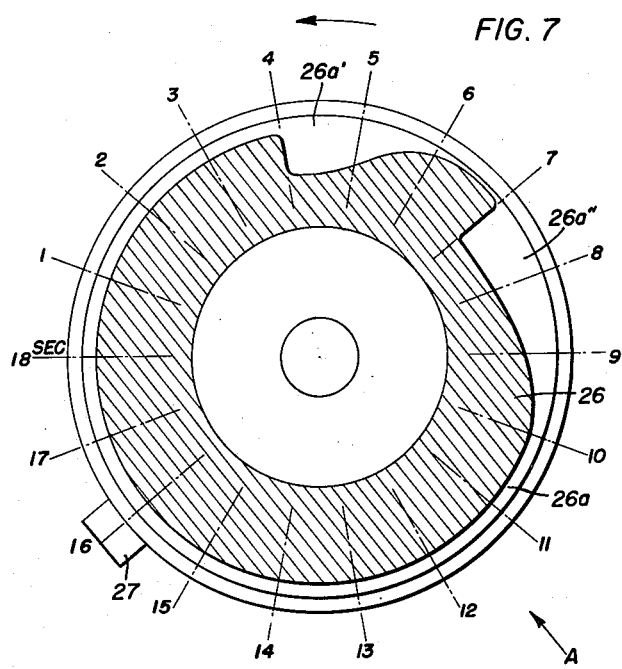
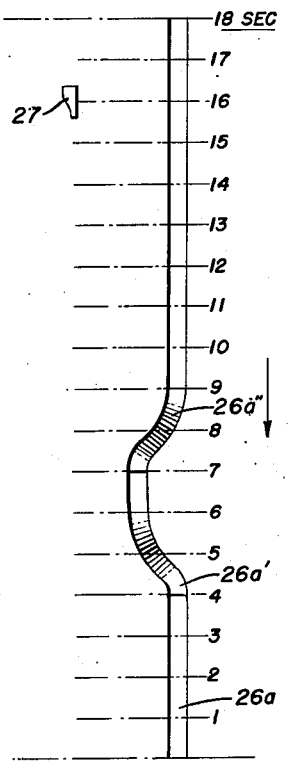
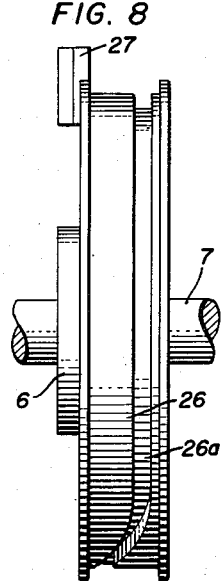
INVENTOR
AUGUSTINE VOJTECH JIROUCH
BY
AGENT Patented Dec. 16, 1952

2,621,706

UNITED STATES PATENT OFFICE 2,621,706

FILM SPLICING APPARATUS

Augustine Vojtech Jirouch, London, England

Application August 24, 1949, Serial No. 112,137
In Czechoslovakia July 25, 1947

11 Claims. (Cl. 154—42.1)

This invention relates to the splicing together of the ends of two portions of cinematographic or like film.

As a rule a simple press is used for splicing two ends of a cinematographic or other film material. Further simple equipment is used for cutting the ends and scraping the gelatine part of the film, which eases the operation of splicing.

Apart from the above there are a few machines with hand-operated mechanism, which, however, are complicated and have not been successful in practice.

In attempting to improve the splicing machine the durability of the splice has been borne in mind. During the tests of solubility of various kinds of film base (cellulose nitrate, cellulose acetate, cellulose acetate butyrate, or propionate, cellulose triacetate) it has been ascertained that the application of certain solutions under certain pressure together with suitable filling ingredients and plasticisers can bring about a homogeneous joining of two ends of film material.

The resulting splice shows elasticity and flexibility equal to that of the remaining material, and in addition, it cannot be broken even by the application of considerable strength.

The object of the invention is to provide apparatus adapted to apply this principle in a simple and effective manner, and substantially automatically, so that after the films ends have been fitted into apparatus according to the invention, no special attention is required to obtain a good splice. Such apparatus may thus be operated by unskilled or semi-skilled workmen.

The invention accordingly consists in film-splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, and overlapping portions of said two clamping members adapted to come together, and grip the ends of said two films together therebetween, when said clamping members are moved to film splicing positions.

In one convenient form the invention may comprise a table or bench formed in two parts to which the separate film ends can be secured, both parts being movable in relation to cutting and/or other instruments for preparing the film ends, and being movable together in order to bring the prepared film ends into joining contact, and to hold them pressed together, e. g. between jaws, until the joint is completed.

The invention will be clearly understood from the following description of one form (given, however, merely, by way of example), which it may assume, and this description will be more readily followed by reference to the accompanying drawings, wherein:

Figure 1 is a vertical sectional elevation of apparatus according to the invention, viewed from the front;

Figure 2 is a side sectional view along the line II—II of Figure 1;

Figure 3 is a plan view of the apparatus shown in Figures 1 and 2;

Figures 4, 5 and 6 represent details of the invention, Figure 6 being shown on an enlarged scale;

Fig. 7 is an enlarged sectional view of a cam wheel for the actuation of auxiliary devices;

Fig. 8 is a side view of the cam wheel; and

Fig. 9 is a developed view of a cam groove in the cam wheel shown in Figs. 7 and 8.

In carrying the invention into effect in one convenient manner, as shown in the accompanying drawings, film-splicing apparatus comprises a frame 1 supporting a bench or table formed of two movable parts, 2 and 4. One part 2 of the bench is supported on a shaft 3, allowing it to oscillate transversely of the apparatus, while the other part 4 is in the form of a frame vertically slidable in guides 5 of frame 1 (Figure 2). A shaft 7 mounted in suitable bearings is connected to an electric motor or other suitable drive, extends through the frame member 4, and carries cams 6 and 8 adapted to operate the elements 2 and 4. Cam 6 runs against a spine or stub 9 of element 2 and upon rotation rocks that element about its pivot shaft 3 against the action of its spring load 10, as shown in Figures 4 and 5. The frame member 4 is urged to its uppermost position by a compression spring 13 (Figure 2), and carries internally a block 11 (slidable in guide grooves in the sides of frame 4) which is held in contact with cam 8 by compression springs 12. Screw means are provided, as shown, allowing adjustment of compression of springs 12. The frame 4 is moved downwards by rotation of cam 8 as will hereinafter appear.

The top, working, surfaces of the elements 2 and 4 are channelled (Figures 4 and 5) to receive the film ends, and the surfaces of these channels are preferably of convex curvature, as shown. Pegs are provided in the channels to receive the sprocket holes of the films for locating the films accurately in position thereon; and the films are held down by hinged or pivoted cover members 14, 15, provided with releasable locking means 16 and 17. While the adjacent side faces of the upper portions of members 2 and 4 are coplaner and come into contact when member 4 is depressed, the cover 14 is set back from the edge of member 2, whereas the cover 15 projects slightly beyond the edge of member 4, as best seen in Figure 1. On top of the cover 14 is secured a knife or cutting member 18, and the edge of cover 15 being located in line with this cutter 18 ensures that upon downward movement the end of the film carried by member 4 which projects beyond the cover 15 is sheared off. If desired, in addition to knife 18, the cover 14 may also carry on its upper surface a scraping or like device (preferably located adjacent to the locking means 16 thereon) for thinning the film so as to reduce the thickness of its end portion, and for roughening the undersurface of the film beneath the projecting step of cover 15, during relative movements of parts 2 and 4 as described more fully below. Both covers 14 and 15 extend across the full width of the films which they hold down.

On an extension from the guides 5 of frame 1 are supported means for preparing the end of the film mounted in element 2. These comprise a rotating circular knife 19, associated with a grinding device 20 on a common shaft driven by a belt pulley 21. If desired suitable gearing may be interposed between the pulley 21 and the knife 19 and grinder 20. In addition there are provided means for applying adhesive to the film ends, comprising a brush 22 normally dipping into the adhesive container 23, and supported by an arm 24 supported by a universal pivot, and actuated by a depending control bar 25 which at its free end runs in a groove 26a of cam wheel 26, which can be best seen from Figs. 6, 7, 8 and 9. The cam groove 26a is provided with two recesses 26a' and 26a'', best seen in Fig. 7. The cam wheel performs one revolution in 18 seconds which is indicated in Figs. 7 and 9. An extension 27 on the cam wheel 26 automatically releases the lock 16 of cover 14. A broken lever 28 actuated by a cam 29 on shaft 7 serves automatically to release the lock 17 of cover 15.

The use and operation of the apparatus described above are as follows:

One end of a torn film is inserted by its perforations on pegs under cover 14 of the oscillating part 2 and the other end on the pegs under cover 15 of the sliding portion 4 and the apparatus is set in motion by pressing the motor starter. Cam 6 brings part 2 towards the rotating circular knife 19 and grinder 20 and the frayed end of the film inserted into this section is cut by the knife 19 along the edge of this element 2, and the cut end is ground and reduced in thickness by grinder 20, acting both on the opening and the return movements of element 2. Upon the return of this element, the brush 22, from the container 23, is operated by cam wheel 26. The two recesses 26a', and 26a'' in the cam groove 26a actuate the bar 25 to swing the brush 22 out of and into tank 23. The portion of the cam groove 26a between the two recesses 26a', 26a'' (Fig. 9) is laterally displaced and moves the brush over the prepared portion of film in element 2, and the required adhesive is applied and the brush is again returned to container 23. When element 2 returns to its original position the sliding member 4 is set into a receding motion by the action of cam 8 on block 11. By means of the knife 18 on cover 14 of member 2 the frayed end of the film held down by cover 15 is cut, the protruding flap beneath the cover 15 forming the upper portion of the joint. Simultaneously with the cutting operation by knife 18, the under surface of the film projecting beneath the step of cover 15 may be roughened, e. g. by the scraper abovementioned which may be provided on the upper surface of cover 14.

By further downward movement of the slide frame 4 the upper film is brought into contact with the adhesive-smeared surface of the lower film, and is pressed thereagainst by the projecting portion of cover 15. The pressure is uniformly applied, and gradually increases in accordance with the shape of cam 8. The initial and maximum values of this pressure may be regulated by adjustment of the screws of springs 12. When the maximum pressure provided by the full throw of the cam 8 has been obtained, the locks 16 and 17 of the covers 14 and 15 are simultaneously released by the action of extension 27 on cam 26 and the bent lever 28 actuated by the top of cam 29. The block 11 is immediately released by cam 8 and the pressure spring 13 forces the frame 4 into an upward receding movement. The joined film slides off the pegs on the oscillating member 2 and, by its own resilience, also off the pegs on the sliding member 4.

From the above description it will be seen that the two frayed ends of the film are, by the simultaneous action of the tables, not only prepared, i. e. neatly cut and filed down where they are to be joined, but also firmly pressed together after the adhesive has been applied; and the pressure is even along the whole joint. The advantage of this arrangement as compared with other devices lies in a considerable simplification. This is achieved by substituting for several independently adjustable working arms, only two parts of a table or bench operated by cams on a common shaft and driven by a motor. An operator's attention is limited to setting the two ends of the film and pressing the starter, and the remainder of the operation is carried out quite automatically, when the film has been released, the apparatus is ready in position for the next film.

It should be understood that the invention is not restricted solely to the constructional and operational details of the form described above, which may be modified, in order to meet various conditions and requirements encountered, without departing in any way from the scope of the invention.

What I claim is:

1. Film splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, and overlapping portions of said two clamping members adapted to come together, and grip the ends of said two films together therebetween, when said clamping members are moved to film splicing positions.

2. Film splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, film-cutting means located in the path of the end of said other film which is carried by said slidable clamping member during its reciprocating movement, and overlapping portions of said two clamping members adapted to come together, and grip the ends of said two films together therebetween, when said clamping members are moved to film splicing positions.

3. Film splicing apparatus according to claim 2 wherein said film-cutting means are carried on said rockable clamping member.

4. Film splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, film-cutting means located in the path of the end of said other film which is carried by said rockable clamping member during its rocking motion, and overlapping portions of said two clamping members adapted to come together, and grip the ends of said two films together therebetween, when said clamping members are moved to film splicing positions.

5. Film splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, film thickness-reducing means located in the path of the end of the film carried by said rockable clamping member during its rocking movement, and overlapping portions of said two clamping members adapted to come together, and grip the ends of said two films together therebetween, when said clamping members are moved to film splicing positions.

6. Film splicing apparatus comprising a base, a rockable clamping member on said base adapted to receive one film, and adjacent linearly reciprocable slidable clamping member on said base, adapted to receive another film, means for rocking said rockable clamping member, means for reciprocating said slidable clamping member, a rotatable film-cutting knife and a rotatable film-surface grinder supported on a common shaft and located in the path of the end of said other film which is carried by said rockable clamping member during its rocking movement, and overlapping portions of said two clamping members adapted to come together, and grip the ends of said two films together therebetween, when said clamping members are moved to film splicing positions.

7. Film splicing apparatus comprising a base, a rockable clamping member on said base adapted to receive one film, an adjacent linearly reciprocable slidable clamping member on said base, adapted to receive another film, means for rocking said rockable clamping member, means for reciprocating said slidable clamping member, adhesive-applying means adapted to be located in the path of the end of said other film which is carried by said rockable clamping member during its rocking movement, and overlapping portions of said two clamping members adapted to come together, and grip the ends of said two films together therebetween, when said clamping members are moved to film splicing positions.

8. Film splicing apparatus according to claim 7 comprising a bath for holding adhesive, a brush for applying adhesive to the film, and a cam movably mounted on said base for reciprocating said brush between a position of immersion in said bath, and an adhesive-applying position in the path of said film, during a rocking movement of said rockable clamping member.

9. Film splicing apparatus comprising a base, a rockable clamping member on said base adapted to receive one film, an adjacent linearly reciprocable slidable clamping member on said base, adapted to receive another film, means for rocking said rockable clamping member, a cam-compressed spring for moving said slidable clamping member whereby to bring together in face-to-face contact the ends of said two films, and overlapping portions of said two clamping members adapted to come together, and grip the ends of said two films together therebetween, when said clamping members are moved to film splicing positions.

10. Film splicing apparatus according to claim 9 comprising means for adjusting the compression of said spring whereby to vary the pressure applied to hold together the ends of the said films during a splicing operation.

11. Film splicing apparatus comprising a base, a rockable clamping member on said base adapted to receive one film, an adjacent linearly reciprocable slidable clamping member on said base, adapted to receive another film, means for rocking said rockable clamping member, means for cutting the end of said other film which is carried by said rockable clamping member during a rocking movement, means for grinding the splicing surface at the end of said other film which is carried by said rockable member during a rocking movement, means for automatically applying adhesive to the splicing surface at the end of the film carried by said rockable member during a rocking movement, means for reciprocating said slidable clamping member means for cutting the end of said other film which is carried by said slidable clamping member during a reciprocatory movement, and overlapping portions of said two clamping members adapted to come together, and grip the ends of said two films together therebetween, when said clamping members are moved to film splicing positions.

AUGUSTINE VOJTECH JIROUCH.

REFERENCES CITED

The following references are of record in the file of this patent:

UNITED STATES PATENTS

| Number | Name | Date |
| --- | --- | --- |
| 1,175,449 | Hirsch | Mar. 14, 1916 |
| 1,464,265 | Griswold | Aug. 7, 1923 |
| 1,489,261 | Malizia | Apr. 8, 1924 |
| 1,981,368 | Maurer et al. | Nov. 20, 1934 |
| 2,126,298 | Wittel | Aug. 9, 1938 |
| 2,460,619 | Briskin | Feb. 1, 1949 |
| 2,518,927 | Ordman et al. | Aug. 15, 1950 |